United States Patent
Pirzadeh et al.

(10) Patent No.: US 10,108,409 B2
(45) Date of Patent: Oct. 23, 2018

(54) SYSTEMS AND METHODS FOR UPDATABLE APPLETS

(71) Applicant: Visa International Service Association, San Francisco, CA (US)

(72) Inventors: Kiushan Pirzadeh, Foster City, CA (US); Hendy Wong, Foster City, CA (US); Kuen Summers, Foster City, CA (US); Marc Kekicheff, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 739 days.

(21) Appl. No.: 14/589,293

(22) Filed: Jan. 5, 2015

(65) Prior Publication Data

US 2015/0193222 A1 Jul. 9, 2015

Related U.S. Application Data

(60) Provisional application No. 61/923,627, filed on Jan. 3, 2014.

(51) Int. Cl.
*G06F 8/65* (2018.01)
*G06F 21/44* (2013.01)
*G06F 21/53* (2013.01)
*G06F 21/57* (2013.01)

(52) U.S. Cl.
CPC ............ *G06F 8/65* (2013.01); *G06F 21/44* (2013.01); *G06F 21/53* (2013.01); *G06F 21/57* (2013.01); *G06F 21/572* (2013.01)

(58) Field of Classification Search
None
See application file for complete search history.

(56) References Cited

U.S. PATENT DOCUMENTS

| | | | |
|---|---|---|---|
| 6,772,955 B2 | 8/2004 | Yoshimoto et al. | |
| 7,398,381 B2 | 7/2008 | Rudelic | |
| 8,839,227 B2 | 9/2014 | Walston | |
| 2006/0200815 A1* | 9/2006 | Li | G06F 9/4426 717/168 |
| 2010/0012732 A1* | 1/2010 | Pinzinger | G06F 8/66 235/492 |
| 2010/0319009 A1* | 12/2010 | Chafer | H04L 67/02 719/328 |

(Continued)

OTHER PUBLICATIONS

Toma, 2009 "Sample Development on Java Smart-Card Electronic Wallet Application", Academy of Economic Studies Bucharest, Romania.*

(Continued)

*Primary Examiner* — Wynuel Aquino
(74) *Attorney, Agent, or Firm* — Kilpatrick Townsend & Stockton LLP

(57) ABSTRACT

Embodiments of the invention relate to a device comprising an updatable applet and a static applet. For some embodiments, a device is disclosed comprising a processor, one or more memories storing an updatable applet, and a static applet in communication with the updatable applet, wherein the device is configured to receive updates to the updatable applet. The updatable applet and static applet may be executed through an access control software element that may prevent unrestricted access between the applets.

20 Claims, 8 Drawing Sheets

(56) References Cited

U.S. PATENT DOCUMENTS

| | | | | |
|---|---|---|---|---|
| 2011/0107070 A1* | 5/2011 | Barbulescu | ............... | G06F 8/66 |
| | | | | 712/226 |
| 2011/0126190 A1* | 5/2011 | Urbach | ............... | G06F 9/44521 |
| | | | | 717/178 |
| 2014/0172700 A1* | 6/2014 | Teuwen | ............... | G06Q 20/367 |
| | | | | 705/41 |
| 2014/0189671 A1* | 7/2014 | Dujmovic | ......... | G06F 17/30174 |
| | | | | 717/168 |

OTHER PUBLICATIONS

Gadyatskaya, 2012, "Java Card Architecture for Autonomous Yet Secure Evolution of Smart Cards Applications", DISI, University of Trento, Italy.*

* cited by examiner

SYSTEMS AND METHODS FOR UPDATABLE APPLETS

CROSS-REFERENCES TO RELATED APPLICATIONS

This application is a non-provisional of and claims the benefit of priority to U.S. Provisional Application No. 61/923,627, filed Jan. 3, 2014, which is hereby incorporated by reference in its entirety for all purposes.

BACKGROUND

The capability and prevalence of payment devices such as credit cards, debit cards, and payment-enabled mobile phones continues to increase. For example, many payment devices comprise a processor and a storage element including executable code and data. In some cases, it may be desirable to update code or data stored on the storage element.

However, such an update may be inconvenient for various reasons. For example, the update may affect more than the portion of code or data that needs to be altered since the update may require deleting all code and data on the storage element and re-loading the updated code and data. This may require re-personalization of data every time an update is applied and may be costly in terms of processing time, network bandwidth, and power utilized to carry out an update.

Accordingly, there is a need for a system that may be capable of an effective method to apply an update without affecting the whole storage element.

Embodiments of the present invention address these problems and other problems individually and collectively.

BRIEF SUMMARY

Embodiments of the present invention are directed to methods, systems, apparatuses, and computer-readable mediums that enable a code update to an application installed on a device (e.g., a payment device) without requiring the update of the entire contents of the storage medium.

Embodiments of the invention are directed to a device whose executable code (e.g., application code) may include two applets: an updatable applet and a static applet. For some embodiments, a device is disclosed comprising a processor, and one or more memories (e.g., a secure element) storing an updatable applet, and a static applet in communication with the updatable applet, wherein the device is configured to receive updates to the updatable applet. In some embodiments, the device may be a payment device that can be used to conduct payment transactions, and may be in the form of a payment enabled mobile device (e.g., a mobile phone, a tablet, or other suitable forms of portable communication device that a user can carry).

According to embodiments of the present invention, the updatable applet may refer to any data or code stored in a storage medium that may be updated or modified (e.g. an electrically-erasable programmable read only memory (EEPROM)) while the static applet may refer to any data or code stored in a storage medium that is unmodifiable or difficult to modify (e.g. a read-only memory (ROM)). Both the static and updatable applets may comprise some or the entirety of the personalization data.

Some embodiments of the invention allow patches or updates to be applied to the payment device without re-loading all the executable code or re-personalizing all the payment data. Updated code may be loaded as a new version of the updatable applet while the previous version of the updatable applet may be deleted. When a new version of the updatable applet is implemented, the updatable applet may be linked to the static applet during instantiation. A function map may associate functions with their corresponding memory locations and may update accordingly when updated code is added to the updatable applet. Previous data stored into the static applet may remain unaltered, which eliminates the need to re-personalize all the payment data after an updated version of the executable code is loaded and installed.

When an update is implemented, the updatable applet is modified to incorporate not only the updated features, but may also include the equivalent functionality of original code of the static applet before the update if the original code is being replaced or patched. When the updated code of the updatable applet is dependent upon any data in the static applet, the updatable applet may retrieve relevant data from the static applet and then apply the updated code. In some embodiments, updated data elements may be passed back to the static applet as well.

One embodiment of the present invention is directed to a method for processing data using application code including a static applet comprising a first plurality of software functions and an updatable applet comprising a second plurality of software functions stored on a computing device, and an access control software element. The method comprises determining, by a data processor, that the application code (e.g., static applet and/or updatable applet) needs to be updated. The method further comprises updating, by the data processor, the updatable applet and a function map comprising addresses for the software functions in the updatable applet and the static applet. The method further comprises executing, by the data processor, the updatable applet and the static applet, through the access control software element, using the updated function map, to perform a process.

According to embodiments of the present invention, the updatable applet and static applet may comprise shared interfaces that indicate functions that can be accessed by certain modules. The access control software element may control access between the updatable applet and static applet based on the shared interfaces.

These and other embodiments of the invention are described in further detail below.

DETAILED DESCRIPTION

Figure 1:
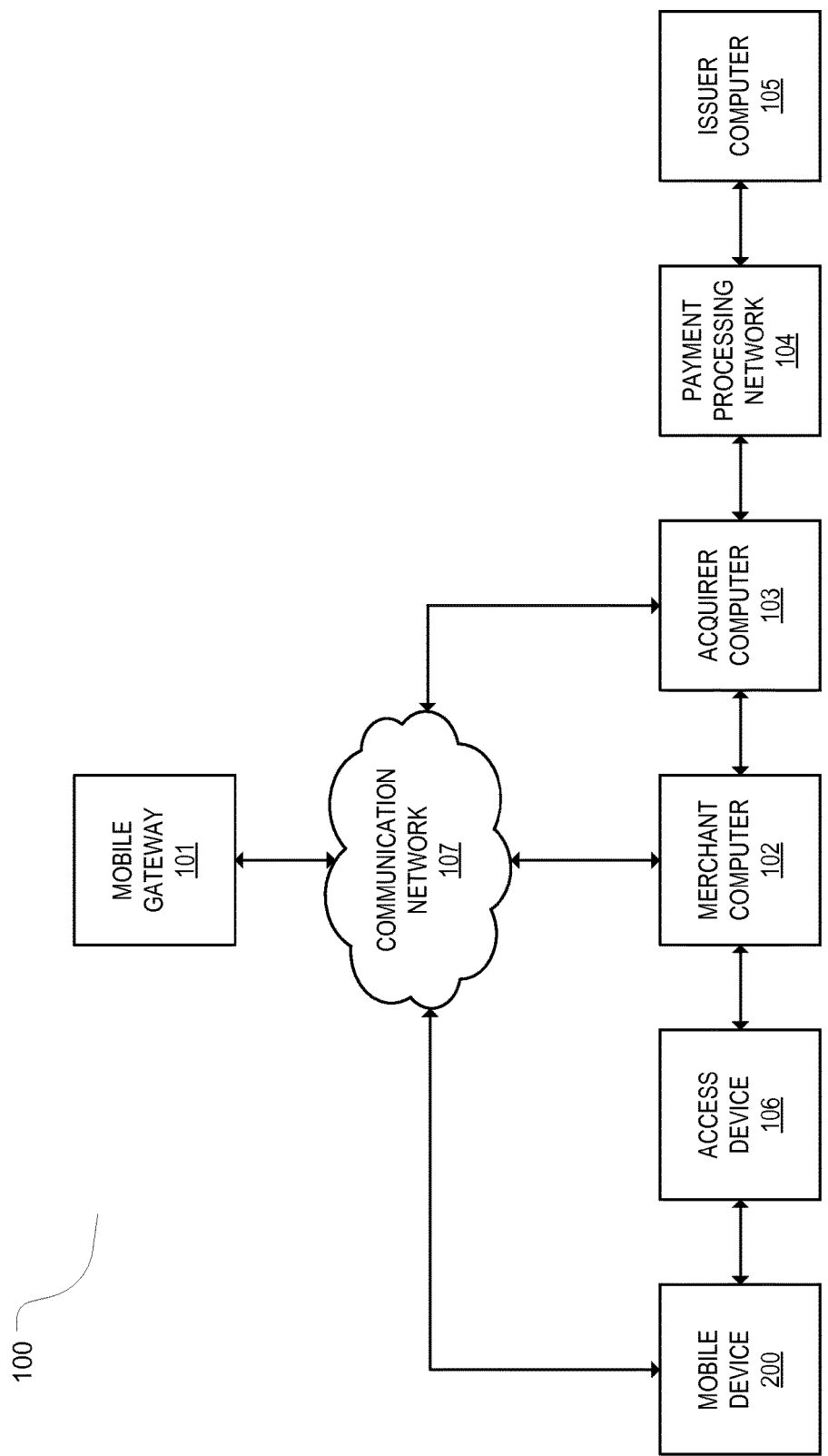
FIG. 1 shows an exemplary system that may be used with embodiments of the invention.

Embodiments of the invention enable a code update without the need to update the entire contents of the storage medium of a device. The device may comprise a static applet and an updatable applet, where updates to the static applet may be carried out by altering the updatable applet and updating a function map containing addresses for software functions in the static applet and updatable applet. This allows for contents in the static applet to remain unmodified, while enabling updated or new functionality and features from updated code. In some embodiments, every time an update is applied to the updatable applet, the static applet may verify the updatable applet by a public/private key encryption process.

In embodiments of the invention, the code in the updatable applet and the static applet may be executed based on the updated function map and through an access control software element. For example, when updated code is added to the updatable applet, the function map may be updated to reflect the address that updated code was added into the updatable applet instead of the formerly associated address in the static applet. When executing code in the updatable applet and static applet, information may be accessed through an access control software element that may regulate access between modules containing functions in shared interfaces. In embodiments of the invention, the static applet and updatable applet may both comprise shared interfaces.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "static applet" may include any data or code that is stored in a storage medium, and is substantially unmodifiable, difficult to modify, or otherwise not modified in ordinary use without updating the entire contents of the storage medium. In some embodiments, the storage medium can be a secure element of a communication device. In some cases, a static applet as described herein may be implemented using a technology that may allow for modification of data and code by a trusted entity. However, modification of the static applet is difficult or impossible during normal operation of the device which stores and executes the static applet.

An "updatable applet" may refer to any data or code that is stored in a storage medium that may be updated or modified. In some embodiments, the storage medium can be a secure element of a communication device, and the updatable applet can be updated or modified without updating the entire contents of the secure element. In some embodiments, the storage medium storing the updatable applet may be a separate memory coupled to a secure element. In contrast to a static applet, an updatable applet may be updated during normal operation.

A "secure element" is an example of a trusted execution environment. A secure element securely stores applications and/or credentials (e.g., financial account numbers) and provides for secure execution of applications. The secure element may comprise a secure memory and execution environment that is a dynamic environment to securely store application code and data and administer the secure execution of applications. The secure element may comprise computing logic, such as a 8-32 bit CISC/RISC processor, a crypto processor for encrypting, decrypting and signing data packets using security algorithms such as AES, DES, ECC, a random number generator, a secure memory (e.g., implemented as ROM, RAM, and/or EEPROM/Flash), a communication interface and a memory management unit. The secure element may also provide delimited (i.e., with definable limits) memory for each application.

A "function" may comprise written computer instructions that may be executed to perform a specified operation. A function may be utilized as part of a larger software program. In some cases, a prewritten set of functions may be stored in a software library. In some cases, functions may be written to perform specialized tasks. A function may or may not return a value when executed.

A "function map" may store logical connections between functions and their corresponding characteristics. For example, a function map may comprise a software table containing an entry for each function and an associated characteristic for each function. Information stored in a function map may be updated, altered, or deleted during execution of a software program. In embodiments of the invention, a function map may associate each function with its corresponding location in memory. The function map may be accessed to determine the memory address of code to be executed when making a function call. The information stored in the function map may be updated to reflect a change made to the functionality of a function, which may be stored in a new memory location.

A "module" may be a portion of a software program. For example, a module may comprise one or more functions. In some cases, a software program may be composed of one or more independently developed modules. In embodiments of the invention, one or more functions residing in the updatable applet or static applet may make up a module.

An "interface" may be a boundary across which two entities or systems may communicate with each other. A shared interface may be a type of interface through which an entity may share its information with one or more other entities. In some embodiments, a shared interface may indicate specific entities that may access certain information defined in the shared interface. For example, a first entity may comprise a shared interface. The shared interface may comprise code or data associated with the first entity. Additionally, the shared interface may comprise identifiers of other entities that may access the information stored in the shared interface. A second entity may request access to information in the shared interface. If the shared interface indicates that the second entity may access the information, then the second entity may be able to communicate with and utilize information in the shared interface of the first entity. In embodiments of the invention, a module may comprise a shared interface, which may comprise functions or data that may be shared, as well as indicate the modules that may access the shared interface. In some embodiments, the modules that may gain access may be identified by the names of functions within the modules.

An "access control software element" may regulate communication between multiple entities. A firewall may be an example of an access control software element and may prevent unrestricted access to or from an entity. A firewall may be implemented by software and may be customized with certain functionalities and protection features. In embodiments of the invention, an updatable applet and a static applet may be executed through an access control software element in order to perform a process. The access control software element, which may be a firewall, may determine whether entities may request certain code or data from the shared interfaces of the updatable applet or the static applet.

Embodiments of the invention provide several advantages. For example, embodiments enable a device comprising an updatable applet and a static applet to be updated without requiring the entire contents of a secure element to be replaced. Updating an updatable applet as described for embodiments of the invention may allow the update to be smaller and faster to deploy than if data or code of a static applet was also required to be updated.

Embodiments of the invention provide the additional advantage of avoiding the re-personalization of a secure element after installing an update. For example, in some embodiments, a static applet may comprise personalization data such as a user's name, account details, and payment information. An updatable applet may comprise other ancillary functions relating to payment transactions. Since an update only modifies the updatable applet, this allows the static applet to be maintained as-is with the personalization data. Further, since personalization data is isolated from the updatable applet, the updatable applet may be kept substantially identical for multiple users. Thus, the infrastructure required to deploy updates may be reduced.

Embodiments of the invention provide the further advantage of reducing testing requirements for updates. In some cases, core features may be implemented on the static applet, and value-add or other ancillary features may be implemented on an updatable applet. Thus, if a testing or certification process is required for updates to core features, the certification may only need to be performed once (i.e., when the static applet is loaded). Further testing or certification may be avoided if updates to the updatable applet do not change core functionality.

I. Payment Systems and Methods

FIG. 1 shows a system according to an embodiment of the invention. The system comprises a user (not shown) who may operate a mobile device 200. The user may use mobile device 200 to conduct payment transactions in communication with a merchant computer 102. As used herein, a "mobile device" may include a mobile phone, tablet, netbook, laptop, or any other suitable mobile computing device. Merchant computer 102 may be connected to acquirer computer 103. Acquirer computer 103 may be connected to issuer computer 105 via payment processing network 104. Mobile device 200, merchant computer 102, and acquirer computer 103 may also be in communication with a mobile gateway 101 by a communication network 107.

A "mobile gateway" may include any suitable network point that acts as an entrance to another network. A mobile gateway according to an embodiment of the invention may include a server that is configured to receive encrypted payment information from a mobile device, validate the mobile device, decrypt the payment information, and send it to a computing device. In some embodiments of the invention, a mobile gateway may be operated as part of a merchant computer 102, acquirer computer 103, or payment processing network 104, instead of being a stand-alone entity.

The communication network 107 may include any suitable network entities and devices that can enable connectivity amongst various entities. In some embodiments of the invention, the communication network 107 may enable wireless communication that may to allow the exchange of information between entities. In some embodiments, a communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

An "issuer" may typically refer to a business entity (e.g., a bank) that maintains financial accounts for a user and often issues a mobile device 200 such as a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer 102, acquirer computer 103, payment processing network 104, and issuer computer 105) to enable communications or to perform one or more of the functions described herein.

The payment processing network 104 may include data processing subsystems, networks, and operations used to support and deliver certificate authority services, authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 104 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 104 may use any suitable wired or wireless network, including the Internet.

In some payment transactions, the user purchases a good or service at merchant computer 102 using a mobile device 200. The user's mobile device 200 can interact with an access device 106 at a merchant associated with merchant computer 104. The access device 106 may be any suitable device that may comprise the capability to accept a transaction made by a payment device. For example, the user may tap the mobile device 200 against an NFC reader in the access device 106. When the mobile device 200 interacts with the access device 106 or merchant computer 102, the access device 106 or merchant computer 102 may communicate with a mobile application. Alternatively, the user may indicate payment details to the merchant electronically, such as in an online transaction.

An authorization request message may be generated by mobile device 200 or merchant computer 102 and then forwarded to the acquirer computer 103. After receiving the authorization request message, the authorization request message is then sent to the payment processing network 104. The payment processing network 104 then forwards the authorization request message to the corresponding issuer computer 105 associated with an issuer associated with the user.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction, such as a cryptogram signing the transaction data (e.g. an authorization request cryptogram), etc. The authorization request message may also include other information such as information that identifies the access device that generated the authorization request message, information about the location of the access device, etc.

After the issuer computer 105 receives the authorization request message, the issuer computer 105 sends an authorization response message back to the payment processing network 104 to indicate whether the current transaction is authorized (or not authorized). The payment processing network 104 then forwards the authorization response message back to the acquirer 103. In some embodiments, payment processing network 104 may decline the transaction even if issuer computer 105 has authorized the transaction, for example depending on a value of the fraud risk score. The acquirer 103 then sends the response message back to the merchant computer 102.

An "authorization response message" may be an electronic message reply to an authorization request message generated by an issuing financial institution 105 or a payment processing network 104. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 104) to the merchant computer 102 that indicates approval of the transaction. The code may serve as proof of authorization. As noted above, in some embodiments, a payment processing network 104 may generate or forward the authorization response message to the merchant.

After the merchant computer 104 receives the authorization response message, the merchant computer 104 may then provide the authorization response message for the user. The response message may be displayed by the mobile device 200, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 104. A clearing process is a process of exchanging financial details between an acquirer and an issuer to facilitate posting to a customer's payment account and reconciliation of the user's settlement position.

Payment transactions in accordance with the invention may also be conducted in any other suitable manner. For example, instead of mobile device 200 communicating with merchant computer 102, a user's portable user device (e.g., a credit card, debit card, or smart card) may be used at an access device (e.g., a point of sale (POS) terminal) connected to merchant computer 102.

II. Applet Systems

Figure 2:
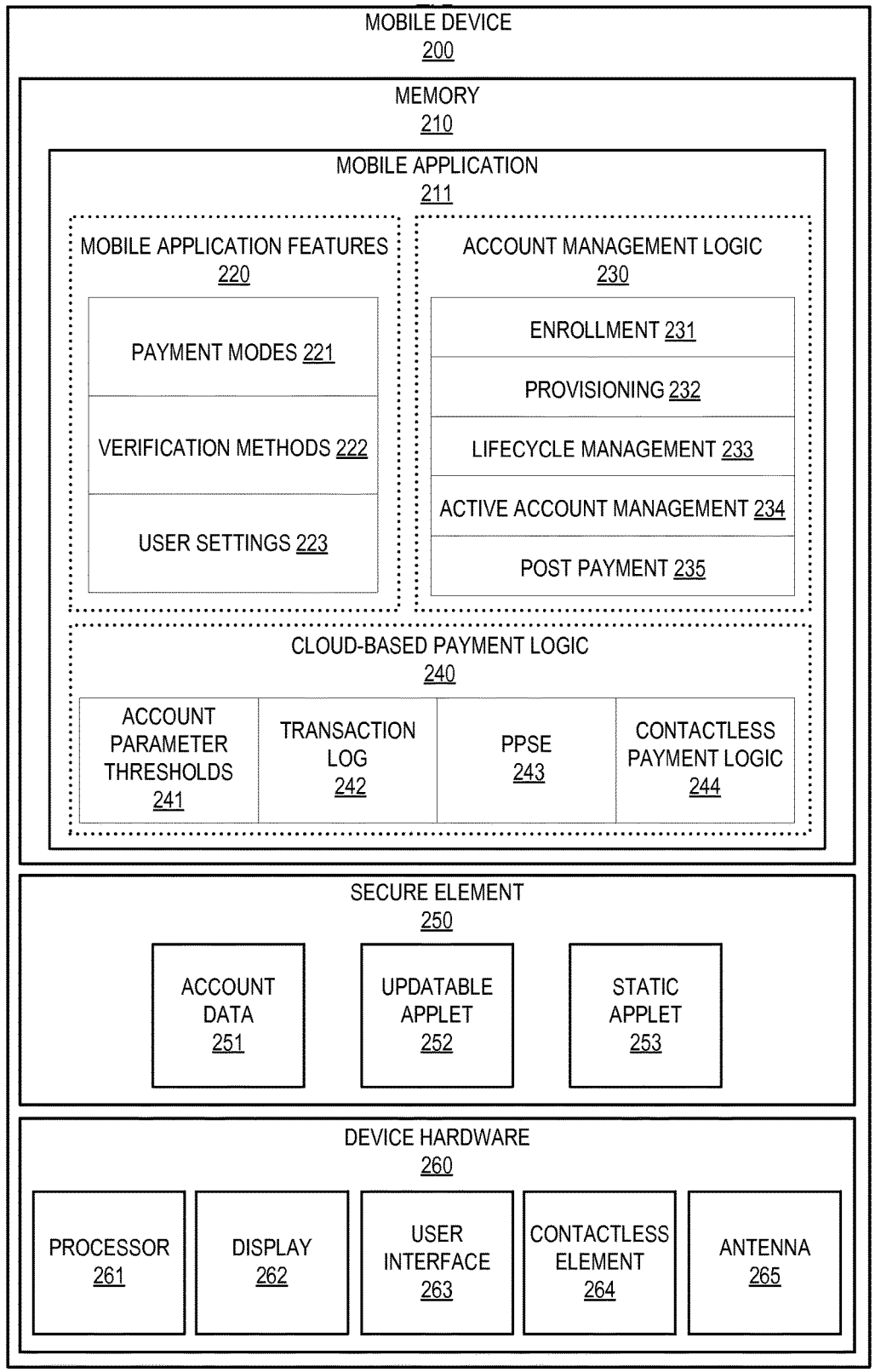
FIG. 2 shows mobile device that may be used with embodiments of the invention.

FIG. 2 illustrates a mobile device 200 that may be used in embodiments of the invention. The mobile device 200 may include a mobile phone, tablet, netbook, laptop, or any other suitable mobile computing device. Mobile device 200 may comprise a memory 210, a secure element 250, and device hardware 260. The memory 210 may comprise a mobile application 211, such as a mobile wallet application or mobile payment application. The secure element 250 may comprise account data 251, an updatable applet 252, and a static applet 253.

Mobile application 211 may include any mobile program, software, or other suitable executable code suitable to conduct a payment transaction. In some embodiments, mobile application 211 may be a merchant-specific application. In other embodiments, mobile application 211 may be general purpose, such as a web browser. In some embodiments, the mobile application 211 may comprise mobile application features 220, account management logic 230, and cloud-based payment logic 240.

The mobile application features 220 may include payment modes 221, verification methods 222, and user settings 223. Payment modes 221 may include logic required to support various ways of setting mobile application 211 and mobile device 200 to initiate a payment, and may include support for various types of payment. Verification methods 222 may include logic required to confirm a mobile application passcode, device verification method, or any other verification information methods supported by mobile application 211. User settings 223 may include any logic required to apply settings indicated by the user of the mobile application 211 on the mobile device 200. Mobile application 211 may receive user settings 223 options, or a subset thereof, in a suitable manner or assume a default for one or more of the options. User settings 223 may describe the general behavior of mobile application 211 and may include options to select or change payment modes, passwords, and any other characteristics surrounding the use of the mobile application 211.

Account management logic 230 of mobile application 211 may include logic to process information for a cloud-based payments service. Such logic may be for account enrollment 231, account provisioning 232, account lifecycle management 233, active account management 234, and post payment 235. Account enrollment 231 includes logic for a consumer to initiate the enrollment of an account to the cloud-based payment service. Account provisioning 232 includes logic to process the issuer data to configure the account into mobile application 211, including the provisioning of the initial account parameters. Account lifecycle management 233 may include logic to initiate and process account lifecycle events such as consumer initiated delete, issuer-initiated delete, issuer-initiated suspend, and/or issuer-initiated resume, etc. Active account management 234 is utilized to initiate a request to update parameters when account parameter thresholds 241 have been exceeded. Post payment 235 interactions logic is utilized to support payment verification and may include logic to receive and respond to requests for the mobile application transaction log 235. Post payment 235 interactions logic can also be utilized to support account replenishment, and may include logic to extract required information (i.e., sequence counter) from transaction log 242 to send as part of an account parameter replenishment request.

Cloud-based payment logic 240 of mobile application 211 may include contactless payment logic 244, proximity payment system environment (PPSE) logic 243, a transaction log 242, and account parameter thresholds 241. Contactless payment logic 244 includes functionalities that enable contactless communications to conduct a contactless transaction with a contactless reader of an access device 106 associated with a merchant computer 102. PPSE 243 may be utilized to inform the contactless payment terminal which payment product is available on mobile device 200. The payment terminal may then utilize this information to select the payment account to initiate a contactless transaction. Transaction log 242 may be utilized for post-payment support. For example, mobile application 211 may maintain a transaction log 242, which may be hidden from the consumer. It may retain transaction details for transactions initiated from mobile device 200. Mobile application 211 may utilize the system transaction verification log 242 to support active account management processes and post payment interactions. Account parameter thresholds 241 are initially configured and can potentially be updated with different thresholds to inform mobile application 211 when to initiate a request for updated account parameters.

The secure element 250 may securely store account data 251, updatable applet 252, and static applet 253. In some embodiments, one or more of mobile application 211, updatable applet 252, and static applet 253 may be stored in the secure storage memory of a secure element 250. In some embodiments, PPSE 243 functionalities may be provided from secure element 250.

The account data 251 may comprise any information relating to a user account associated with a mobile device 200. The account data 251 may include user credentials, such as financial account numbers, and any other sensitive information that may be associated with a user account. The account data 251 may be utilized by mobile application 211 to execute a transaction.

Updatable applet 252 may include any API, service, application, applet, or other executable code stored on a mobile device 200 (e.g., in a secure element 250). Updatable applet 252 may be configured to execute payment functionality implemented by static applet 253, retrieve payment information from static applet 253, and communicate with mobile application 211.

In some embodiments, updatable applet 252 may communicate with mobile application 211 using an application programming interface (API). For example, updatable applet 252 may comprise one or more classes implementing interfaces defined in the API. The mobile application 211 may utilize the API to perform various payment related functions, such as receiving payment account information associated with a payment account.

In some embodiments, updatable applet 252 may include one or more classes and methods that are common to all multiple transactional paths (e.g., incrementing a transaction count or retrieving a card verification code) or data that would likely be updated or patched when a new function is introduced (e.g., a list of manufacturer IDs).

Static applet 253 may include any API, service, application, applet, or other executable code stored on a mobile device 200 (e.g., in a secure element 250). Static applet 253 may comprise one or more shareable interfaces that are accessible by updatable applet 252. Updatable applet 252 may also comprise one or more shareable interfaces that are accessible by static applet 253. In some embodiments, static applet 253 may only be accessed through the shareable interfaces. In addition, in some embodiments, the static applet 253 may only be accessed by updatable applet 252. This improves security, since access to sensitive functionality is limited both in scope (specifically to the shared interfaces), and to a single point of entry (i.e., the updatable applet 252).

In some embodiments, data personalization may be solely handled by the static applet 253. The updatable applet 252 may be patched or modified without a need to re-personalize static applet 253. This reduces code complexity, minimizes errors, and reduces performance issues due to data traffic. In such embodiments, when a patch is needed, the updatable applet 252 may receive data from the static applet 253 to be used in the patched code. If the functionality of the static applet 253 is patched or updated, the main process of the updatable applet 252 may be updated to get data from the static applet 253 and then call the patched code. Any updated data elements will be passed back to the static applet 253. Processing can continue based on an updated function map that is described in detail below.

In some embodiments, updatable applet 252 and static applet 253 may comprise data containers, each of which may contain multiple data elements. These containers can help minimize the number of data elements that are created when a new instance of updatable applet 252 or static applet 253 is created, thus improving deployment performance and reducing infrastructure needs.

It should be noted that although updatable applet 252 and static applet 253 are shown in FIG. 2 as being included in a mobile device 200, embodiments are not so limited. For example, in some embodiments, updatable applet 252 and static applet 253 may be included on a smart card. Further, updatable applet 252 may communicate directly with merchant computer 102 or an access device 106 (e.g., at a POS terminal) associated with the merchant computer 102.

Device hardware 260 of mobile device 200 may comprise processor 261, display 262, user interface 263, contactless element 264, and antenna 265.

Processor 261 may be any suitable processor operable to carry out instructions on the mobile device 200. The processor 261 is coupled to various units of the mobile device 200, including memory 210, secure element 250, display 262, and any other components of device hardware 260 and mobile device 200.

The processor 261 may comprise one or more CPUs. A CPU comprises at least one high-speed data processor adequate to execute program components for executing user and/or system-generated requests. The CPU may be a microprocessor as those that are commercially available from Intel or AMD.

Display 262 may be operable to visually present any information to a user using mobile device 200. In some embodiments, the display 262 may allow the user to trigger input elements. For example, the user may activate a software button or slider by touching display 262.

User interface 263 may be displayed on display 262 and may be utilized by the user of mobile device 200 to interact with mobile application 211. User interface 263 may be implemented by software and may display buttons, indicators, and other input elements that may affect the functionality of mobile application 211 based on user input. In some embodiments, user interface 263 may prompt the user for certain information or may allow the user to instruct the mobile application 211 or mobile device 200 to carry out certain operations. For example, the user may interact with user interface 263 to alter the state of user settings 223 of mobile application 211.

Contactless element 264 may enable mobile device 200 to interface with access device 106 to complete a transaction. Contact element 264 may include a near field communications data transfer element or any suitable form of short range or contactless communication technology.

Antenna 265 may be utilized by mobile device 200 to send and receive wireless communications. Antenna 265 may assist in connectivity to the Internet or other communications network, and enabling data transfer functions. Antenna 265 may enable SMS, USSD, as well as other types of cellular communications, such as voice call and data communications.

Figure 3:
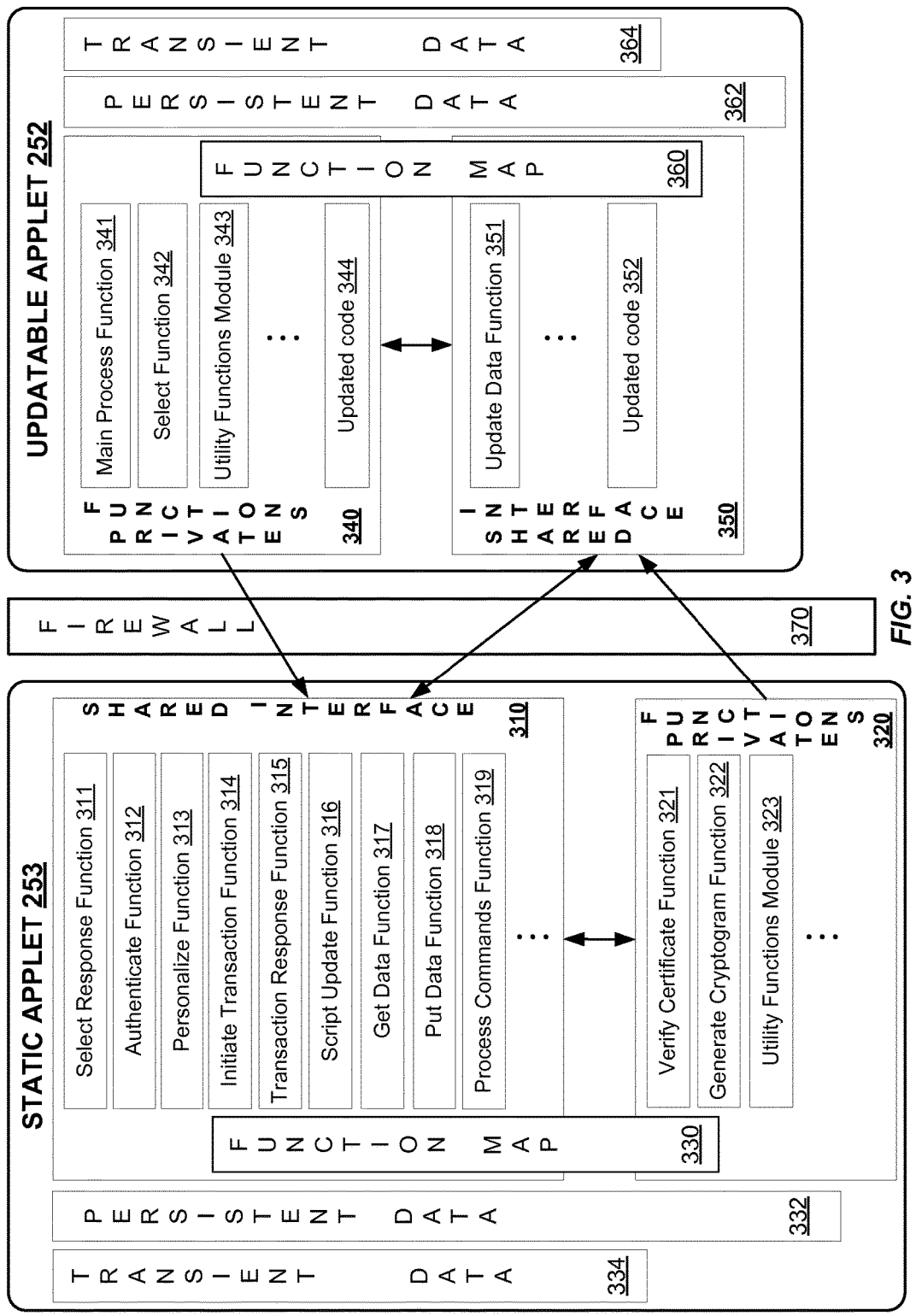
FIG. 3 shows a diagram of subcomponents in an example of a static applet and an example of an updatable applet.

FIG. 3 shows a diagram of subcomponents in an example of a static applet 253 and updatable applet 252. The static applet 253 and updatable applet 252 may reside on any suitable device, such as in a secure element 250 of a mobile device 200 as shown in FIG. 2. The static applet 253 and the updatable applet 252 may communicate through an access control software element, such as firewall 370.

Static applet 253 may comprise a shared interface 310, private functions 320, function map 330, as well as one or more data elements, including persistent data 332 and transient data 334. The shared interface 310 and private functions 320 may comprise one or more functions or modules.

The function map 330 may associate functions in updatable applet 252 and static applet 253 with corresponding locations in memory. The function map 330 may be updated when an update is made to the updatable applet 252. Before calling a function, the static applet 253 may access the function map 330 to determine what code to execute when processing functions. In some embodiments, the function map 330 may be synchronized to match the values in the function map 360 stored in the updatable applet 252.

Persistent data 332 may comprise any information that may remain in storage when utilized by the static applet 253 to execute various processes. For example, persistent data 332 may include one or more classes (i.e., software defining properties of software entities) that may be utilized to implement the functions defined by the static applet 253.

Transient data 334 may comprise any information that may be utilized by the static applet 253 and that is not stored across execution of various processes. For example, transient data 334 may include process dependent data that may be discarded or reset back to a default value after a process is executed.

As shown in FIG. 3, a shared interface 310 may include functions or modules that may allow the updatable applet 252 to access the static applet 253. A Select Response Function 311 may be accessed after updatable applet 252 determines that processing of functions should be continued and may determine the next function to be executed. An Authenticate Function 312 may help determine whether processing of functions should continue and may verify whether a required level of security has been met. A Personalize Function 313 may handle all data personalization, which eliminates the need to re-personalize after a new version of the updatable applet 252 is loaded and installed. An Initiate Transaction Function 314 may initiate a payment transaction process. A Transaction Response Function 315 may execute any code utilized for part of a payment transaction process. A Script Update Function 316 may apply an update of any code or data in the static applet 253 indicated by the updatable applet 252.

A Get Data Function 317 and a Put Data Function 318 may allow for data synchronization between updatable applet 252 and static applet 253. The Get Data Function 317 may retrieve any data from the static applet 253 that may be requested by the updatable applet 252. The Put Data Function 318 may set any data in the static applet 253 that may be requested by the updatable applet 252. In addition to the functions allowing the updatable applet 252 to get and set data in static applet 253, the functions may also indicate whether a received command originates external to the device (i.e., communication to the updatable applet 252 from access device 106 or another entity external to mobile device 200) or internal to the device (i.e., communication from the updatable applet 252). This information may change what kind of data the requestor may be allowed to access. When the functions are accessed internally, the updatable applet 252 may be able to retrieve and save data internal to the processes running within the static applet 253, such as internal indicators and transient values of transient data 334.

Some commands may be sent to a Process Commands Function 319, which may check the function map 330 to process the functions that it receives. This may be useful if updatable applet 252 wants to execute a function that is not accessible in shared interface 310, but is instead part of private functions 320 of static applet 253. In this case, the function map 360 may indicate the memory location of the Process Commands Function 319 in shared interface 310 instead of the location of the function residing in private functions 320. Attempting to call a private function in static applet 253 directly can cause an error. After the updatable applet 252 calls the Process Commands Function 319, then the static applet 253 may call or execute one or more functions residing in private functions 320 or shared interface 310.

The private functions 320 may include functions or modules that the static applet 253 may not allow access to the updatable applet 252. The private functions 320 may not be included in the shared interface 310 and may be called internally within the static applet 253 in some embodiments. A Verify Certificate Function 321 may utilize a public key stored in the static applet 253 to determine whether a certificate created by the updatable applet 252 is valid. This verification process may ensure that the appropriate entities are receiving and sending information to each other. A Generate Cryptogram Function 322 may generate a transaction cryptogram for the application. Utility Functions Module 323 may comprise one or more functions that may carry out any other processes to be utilized by static applet 253. In some embodiments, information may be communicated between the updatable applet 252 and the static applet 253 to execute the update. The private functions 320 may access shared interface 350 of updatable applet 252.

Updatable applet 252 may comprise a shared interface 350, private functions 340, function map 360, as well as one or more data elements, including persistent data 362 and transient data 364. The shared interface 350 and private functions 340 may comprise one or more functions or modules.

The function map 360 may associate functions in updatable applet 252 and static applet 253 with corresponding locations in memory. The updatable applet 252 may access the function map 360 to determine what code to execute when processing functions. The function map 360 may be updated when an update is made to the updatable applet 252. In some embodiments, the function map 360 may be synchronized to update the values in the function map 360 stored in the static applet 253.

The two function maps shown in FIG. 3 serve to demonstrate that both the updatable applet 252 and the static applet 253 may comprise a copy of a function map to utilize during execution of functions. For example, the updatable applet 252 may update function map 360, which may then be synchronized with function map 330 of static applet 253. This ensures that the updatable applet 252 and the static applet 253 may utilize the most updated version of the function map storing appropriate memory locations of executable code. In other embodiments, any function map that is stored in the device may be stored solely in the static applet, solely in the updatable applet, or outside of both the updatable and static applets.

Persistent data 362 may comprise any information that may remain in storage when utilized by the updatable applet 252 to execute various processes. For example, persistent data 362 may include one or more classes that may be utilized to implement the functions defined by the updatable applet 252.

Transient data 364 may comprise any information that may be utilized by the updatable applet 252 and that is not stored across execution of various processes. For example, transient data 364 may include process dependent data that may be discarded or reset back to a default value after a process is executed.

The shared interface 350 may include functions or modules that the updatable applet 252 may allow access to the static applet 253. An Update Data Function 351 may delete, replace, or update any data in the updatable applet 252. Updated code 352 may comprise a code patch that may fix or add functionality to code in the updatable applet 252. In some embodiments, information may be communicated between the updatable applet 252 and the static applet 253 to execute the update.

The private functions 340 may include functions or modules that the static applet 253 may not directly access. The private functions 340 may not be included in the shared interface 350 and may be utilized internally within the updatable applet 252 in some embodiments. A Main Process Function 341 and a Select Function 342 may receive external commands, such as from access device 106, and access the function map 360 to determine how to route the commands. For example, these functions may route the received commands to an Authenticate Function 312 or directly to a Select Response Function 311 of shared interface 310 in the static applet 253. Utility Functions Module 343 may comprise one or more functions that may carry out any other processes to be utilized by updatable applet 252. Updated code 344 may comprise a code patch that may fix or add functionality to any code in private functions 340. In some embodiments, information may be communicated between the updatable applet 252 and the static applet 253 to execute the update. The private functions 340 may access shared interface 310 of static applet 253.

The static applet 253 and updatable applet 252 may communicate through an access control software element. The access control software element may be, for example, firewall 370 that may prevent unrestricted access between one applet to another applet. The firewall 370 may ensure that only information that resides in shared interface 310 of static applet 253 can be accessed by the updatable applet 252 and only information that resides in shared interface 350 of updatable applet 252 can be accessed by static applet 253.

Figure 4:
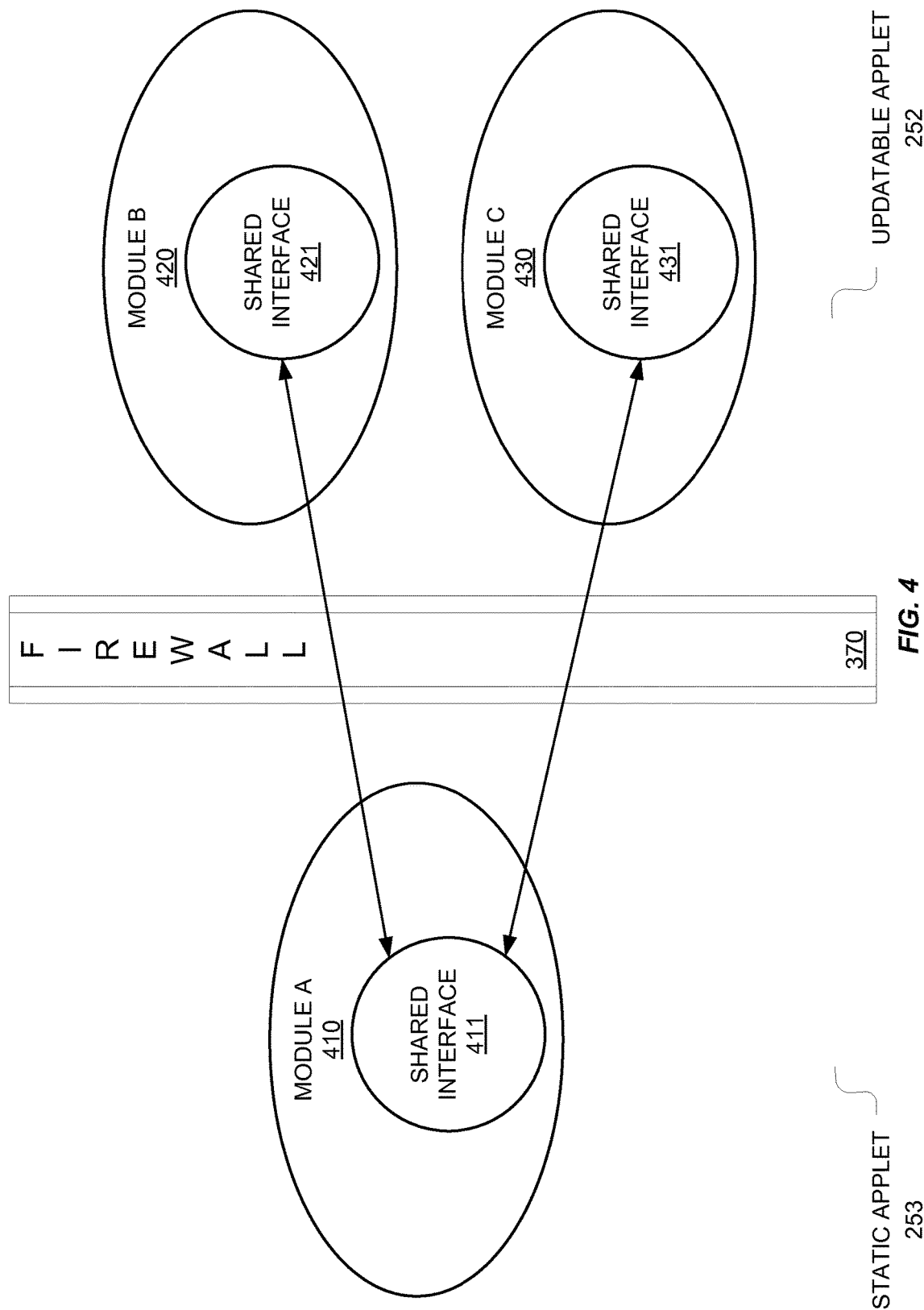
FIG. 4 shows a diagram illustrating the use of functions in shared interfaces in accordance with some embodiments of the invention.

FIG. 4 shows a diagram illustrating how the static applet 253 and updatable applet 252 may interface with each other through the use of shared interfaces in accordance with some embodiments of the invention. Each shared interface in one applet may declare functions that are suitable for access by a group of modules in another applet. As shown, static applet 253 comprises a module A 410 including a shared interface 411. Updatable applet 252 comprises a module B 420 including a shared interface 421 and a module C 430 including a shared interface 431. Module A 410 may interface with Module B 420 and Module C 430 by shared interface 421 and shared interface 431, respectively. Module B and Module C may interface with Module A 410 by shared interface 411.

An access control software element, such as firewall 370, may prevent unrestricted access between updatable applet 252 and static applet 253. Typically, functionality of an applet not exposed through a shared interface may be protected by the access control software element, such as a Java Card firewall. In some embodiments, other types of firewall protection or access controls may be implemented.

In some embodiments, updatable applet 252 may interface with static applet 253 using one or more shareable interface objects (SIOs). In some embodiments, such as when updatable applet 252 and static applet 253 are stored on a Java Card™ device, the SIOs may be implemented using the Java Card™ SIO framework. An SIO may enable one context (e.g., an updatable applet 252) to access objects belonging to another context (e.g., a static applet 253). Typically, an SIO may be an instance of shareable interface and only methods defined in the shareable interface are externally accessible. All data fields and other methods or functions of the SIO are protected by firewall 370.

In embodiments of the invention, each shared interface can declare methods or functions that are suited for a group of modules to utilize. The static applet 253 and module A 410 may define shared interface 411, which can declare methods or functions that are suitable for a group of modules of updatable applet 252 (e.g., module B 420 and module C 430). In embodiments of the invention, updatable applet 252 may also define multiple interfaces, each interface declaring methods or functions that are suitable for modules of static applet 253 (e.g., module A 410). This may allow for communication to be controlled from the updatable applet 252 towards the static applet 253, as well as from the static applet 253 towards the updatable applet 252.

FIG. 3 and FIG. 4 show exemplary functions in static applet 253 and updatable applet 252. While functions in static applet 253 and updatable applet 252 are described with specific names and functionality, embodiments are not so limited. Static applet 253 and updatable applet 252 may comprise any number of functions with suitable naming conventions that enable functionality of static applet 253 and updatable applet 252 as described herein.

III. Applet Update Methods

Figure 5:
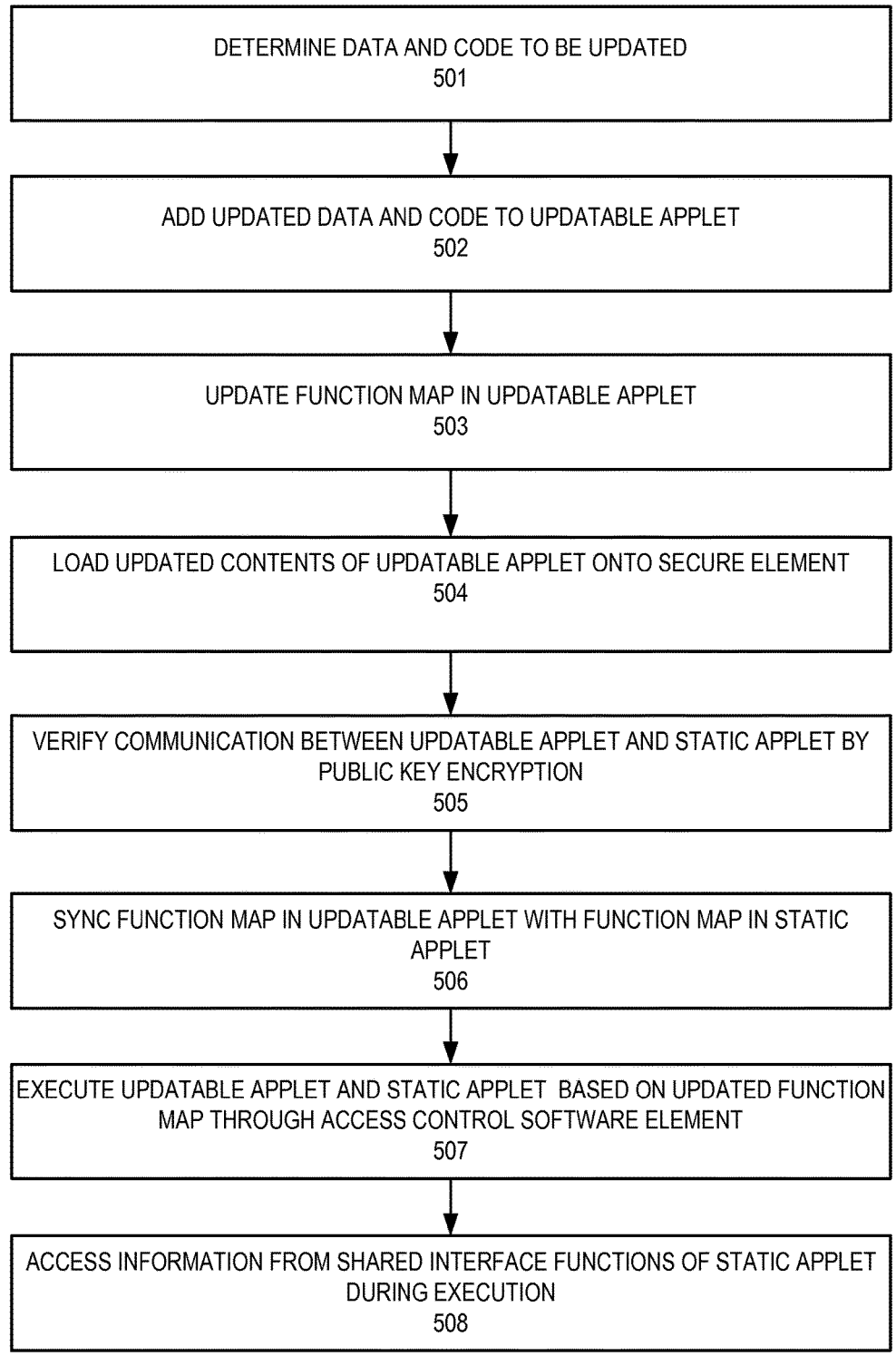
FIG. 5 shows a method for updating an updatable applet according to some embodiments of the invention.

FIG. 5 shows a method 500 for updating an updatable applet 252 according to some embodiments of the invention. Method 500 may be described with reference to FIG. 3. Method 500 may be performed by any suitable entity or combination of entities shown in FIG. 1.

An update in accordance with method 500 may be performed for any suitable reason. For example, in some cases, the update may be to implement new functionality for a payment device. In other cases, the update may be to fix bugs or other issues in existing functionality.

At step 501, data and/or application code to be updated is determined. In some cases, the update may be to replace existing data or code that is part of or stored as an updatable applet 252 or static applet 253. In some cases, the update may add data or code not already present in updatable applet 252 or static applet 253. Hence, the location that the data and code is to be updated to is also determined in this step.

At step 502, the determined updated code and data are added to the updatable applet 252. This allows an update to be applied to the functionality of static applet 253 in a new memory location in updatable applet 252 without altering the code and data of static applet 253. The update may fix a bug or issue existing in static applet 253 or may provide additional functionality to static applet 253.

Updated code that is added by updatable applet 252 may enable ways for data variables associated with an update to be kept in sync with corresponding data variables in static applet 253.

Some data variables may only be utilized in a single function in static applet 253 that is updated in updatable applet 252. In this case, this data in static applet 253 may be indicated to be obsolete so that only the updated value accessible through updatable applet 252 is utilized in future execution of the function.

Some data variables may be utilized by two or more functions, where one of the functions is updated in the updatable applet 252. The data variables may be kept in sync between updatable applet 252 and static applet 253. In this case, patched or updated code in updatable applet 252 may retrieve relevant data from static applet 253 to utilize in execution of the updated function. If any data value of the retrieved data is modified, the updated value may be sent back to static applet 253, which may utilize the value when calling another function.

Some data variables may be utilized locally in a function that calls a sub-process that is updated in updatable applet 252. If the sub-process executed in updatable applet 252 updates the data variables, these updated values may be returned to the function in static applet 253, which calls the sub-process. This allows execution of the function to be completed with the new data value.

Figure 6:
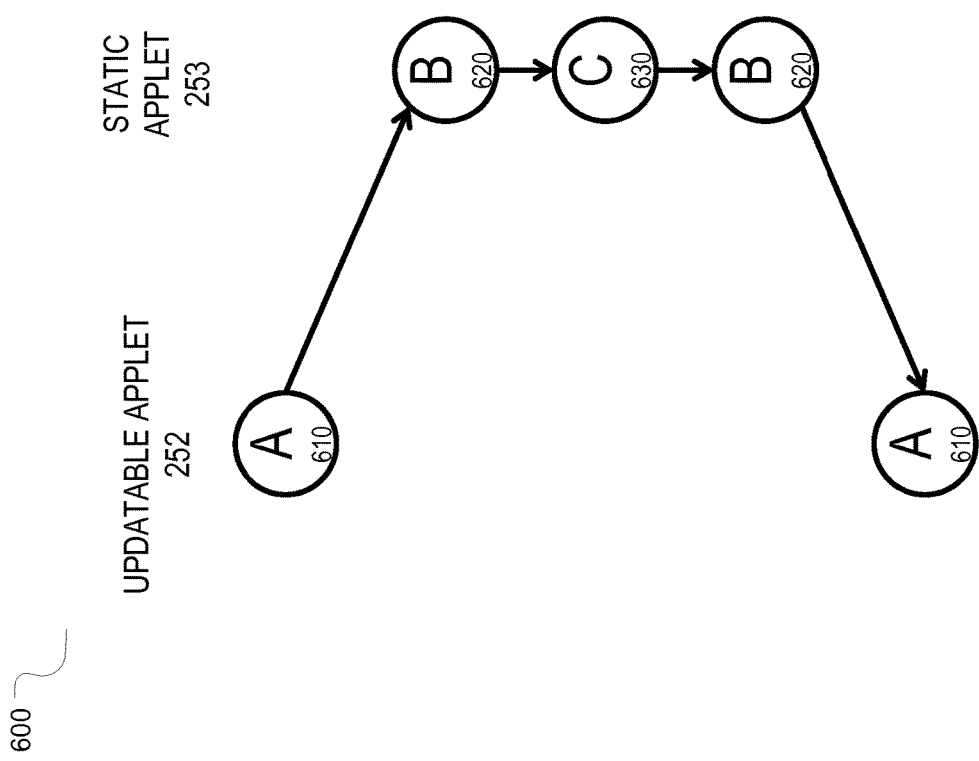
FIG. 6 shows an example of a function call flow diagram and a corresponding function map for one embodiment of the invention.
Figure 7:
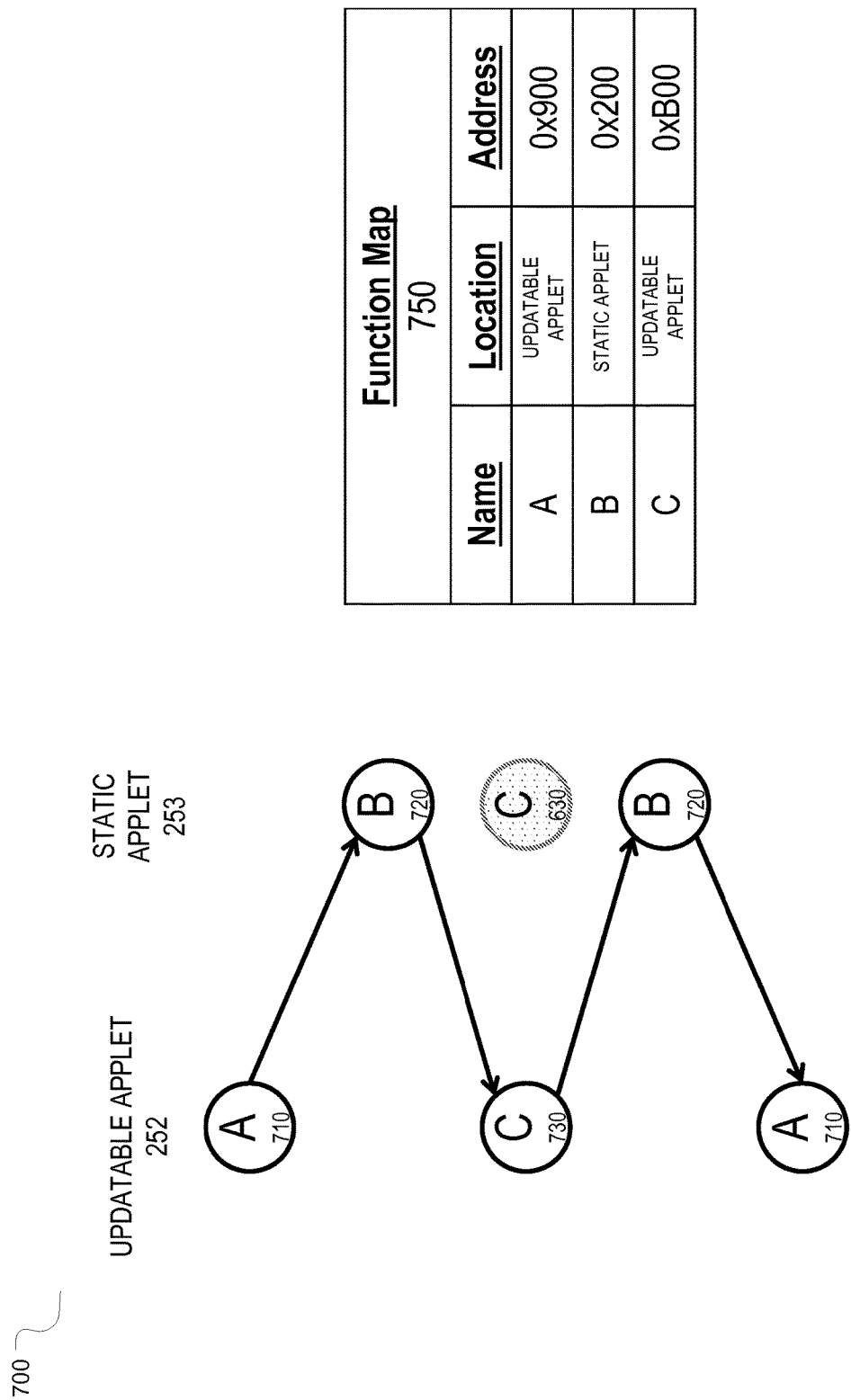
FIG. 7 shows an example of an updated function call flow diagram and a corresponding updated function map for one embodiment of the invention.

At step 503, function map 360 is updated to reflect the memory location of updated code during step 500. The function map 360 may be utilized by updatable applet 252 to determine whether to send received commands either to static applet 253 or to updated code within updatable applet 252. For example, a function stored at address 0x400 of static applet 253, may be updated. Since static applet 253 may not be modified, the updated version of the function may be added to updatable applet 252 at, for example, address 0xB00. Subsequently, function map 360 may be updated to point to address 0xB00 of updatable applet 252 instead of address 0x400 of static applet 253. Hence, when the function is executed, the function map may indicate to execute the newest version of code located in updatable applet 252 instead of static applet 253. An example of an update to a function in static applet 253 is shown in FIGS. 6 and 7.

At step 504, the updated contents of the updatable applet 252 are loaded onto secure element 250 of mobile device 200.

At step 505, the static applet 253 may verify the source and/or authenticity of the updatable applet 252, for example, by utilizing public/private key encryption. This additional security ensures that the updatable applet 252 is sourced from an authentic server computer (e.g., account management logic 230) and if so, the updatable applet 252 is allowed to utilize the shared interface 310 of static applet 253.

In some embodiments of the invention, the static applet 253 may contain cryptographic elements such as a public key that may be utilized to verify the source and/or authenticity of the updatable applet 252. The server computer may utilize corresponding cryptographic elements such as a private key to create a certificate or signature based on certain information on the updatable applet 252. When the updatable applet 252 is instantiated, the updatable applet 252 may contain a verification value from the certificate. During installation of the updatable applet 252, the updatable applet 252 may pass the certificate to the static applet 253. The static applet 253 may then utilize the public key personalized to it to check it against the certificate sent from the updatable applet 252. If the verification value in the certificate can be verified, the static applet 253 may allow the updatable applet 252 access to shared interface 310 of static applet 253. The updatable applet 252 may then be able to call any of the functions or methods in the shared interface 310 of the static applet 253.

In some embodiments, the static applet 253 may keep track of an identifier of updatable applet 252. For example, after the updatable applet 252 is allowed access to shared interface 310 of static applet 253, the static applet 253 may store the application identifier (AID) of updatable applet 252. This application identifier may be utilized by static applet 253 when requesting access to a shared interface of updatable applet 252. If the shared interface of updatable applet 252 indicates that static applet 253 or a module of static applet 253 may access information in the shared interface, firewall 370 may allow communication between static applet 253 to updatable applet 252. Subsequently, static applet 253 may access functions and data residing in the shared interface of updatable applet 252.

At step 506, function map 360 in updatable applet 252 may be synchronized with function map 330 in static applet 253. This ensures that any updates made in function map 360 of updatable applet 252 are reflected in function map 330 of static applet 253 and allows static applet 253 to know execute updated code when appropriate. In some embodiments, step 506 may be carried out during installation of updatable applet 252 in step 505. The "updated function map" referred to in subsequent steps may refer to either function map 330 or function map 360, which may both comprise the most updated mapping of functions to corresponding memory locations.

At step 507, the updatable applet 252 and static applet 253 may be executed to perform a process based on the updated function map through an access control software element. The access control software element (e.g., a firewall) may ensure that modules that access data or code from the updatable applet 252 and the static applet 253 are specified in shared interfaces in the respective applets. The updated function map indicates memory locations of updated code and may route functions appropriately in order to perform a series of operations.

The updatable applet 252 and static applet 253 may access the updated function map every time a function is executed. The function map may indicate whether execution should be passed from the updatable applet 252 to the static applet 253 or from the static applet 253 to the updatable applet 252.

If the static applet 253 determines from the updated function map that the function to be executed next is located in updatable applet 252, the static applet 253 may return execution to the updatable applet 252. In some embodiments, a return value may be sent to the updatable applet 252 to indicate which function of the static applet 253 the execution was returned from or to include any other useful information.

For example, if three of four functions to be executed are located in static applet 253 and the fourth function is located in updatable applet 252, a return value may be sent from static applet 253 to updatable applet 252 for verification. The return value may indicate to the updatable applet 252 that the first three functions were performed by static applet 253. This may allow updatable applet 252 to check that executed functions completed before it starts to execute the fourth updated function to complete processing. In some embodiments, this return value that may be sent when passing execution from the static applet 253 to the updatable applet 252 may be utilized to synchronize data from the static applet 253. For example, the return value may comprise the state of local variables or any parameter from the static applet 253 that may be utilized during execution of updated code the updatable applet 252.

At step 508, the updatable applet 252 may access information from the static applet 253 during execution of updatable applet 252 and static applet 253. Step 508 may be carried out during or in parallel with step 507. The information accessed is defined in shared interface 310 of the static applet 253. In some embodiments, data variables accessed from static applet 253 may be modified by updatable applet 252 when a function is executed. In this case, these modified values may be updated back to static applet 253 at the end of the function. This ensures that data between updatable applet 252 and static applet 253 are kept in sync. In some embodiments, updated contents may be represented as a binary file equal to the size of the updatable applet.

FIG. 6 shows an example of a function call flow diagram 600 and a corresponding function map 650 for one embodiment of the invention. As shown, the function call flow diagram 600 comprises function A 610, function B 620, and function C 630. Function A 610 is stored in updatable applet 252, whereas functions B 620 and C 630 are stored in static applet 253. In addition, a function map 650 corresponding to the functions A-C 610-630 is shown. Updatable applet 252 and static applet 253 may each store a copy of function map 650.

In the shown sequence of function calls, function A 610 calls function B 620. In order to determine the location of the executable code corresponding to function B 620, function map 650 is utilized to determine that function B 620 is stored at address 0x200 of static applet 253. Function B 620 then calls function C 630. In order to determine the location of the executable code corresponding to function C 630, function map 650 is used to determine that function C 630 is stored at address 0x400 of static applet 253. Once function C 630 completes, execution returns to function B 620. Once function B 620 completes, execution returns to function A 610.

FIG. 7 shows an example of an updated function call flow diagram 700 and a corresponding updated function map 750 for one embodiment of the invention. Updatable applet 252 and static applet 253 may each store a copy of updated function map 750.

As shown in FIG. 7, function A 710 is stored in the same location (i.e., address 0x900 of updatable applet 252) as function A 610 in FIG. 6. Similarly, function B 720 is stored in the same location (i.e., address 0x200 of static applet 253) as function B 620 in FIG. 6. However, the address pointed to in function map 750 for function C is a different location (i.e., address 0xB00 of updatable applet 252) than that in function map 650 for function C (i.e., address 0x400 of static applet 253) in FIG. 6. The updated location of function C 730 may be due to any of a variety of reasons. For example, a bug or other issues may have been found in function C 630 that was fixed in updated function C 730 or additional functionality not present in function C 630 may have been incorporated into function C 730.

In some embodiments, function C 630 may remain in static applet 253, since the contents of the static applet 253 may not be modifiable. However, since function map 750 no longer refers to this obsolete version (i.e., function C 630) of function C, function calls to function C will no longer execute code at address 0x400 of static applet 253. To reflect this, function C 630 is displayed shaded and in grey and the address indicating function C in function map 750 is updated to address 0xB00 of updatable applet 252.

The sequence of function calls shown in FIG. 7 is similar to that shown in FIG. 6; function A 710 calls function B 720, and function B 720 then calls function C 730. However, function map 750 is used to determine that function C 730 is now stored at updatable applet address 0xB00. Accordingly, updated function C 730 is executed. Once function C 730 completes, execution returns to function B 720. Once function B 720 completes, execution returns to function A 710.

Updating the function map 750 in the manner shown allows embodiments of the invention to re-implement methods stored in static applet 253. In some embodiments, a data map corresponding to data values may similarly be used to re-assign data values stored in static applet 253.

IV. Exemplary Computer Apparatus

Figure 8:
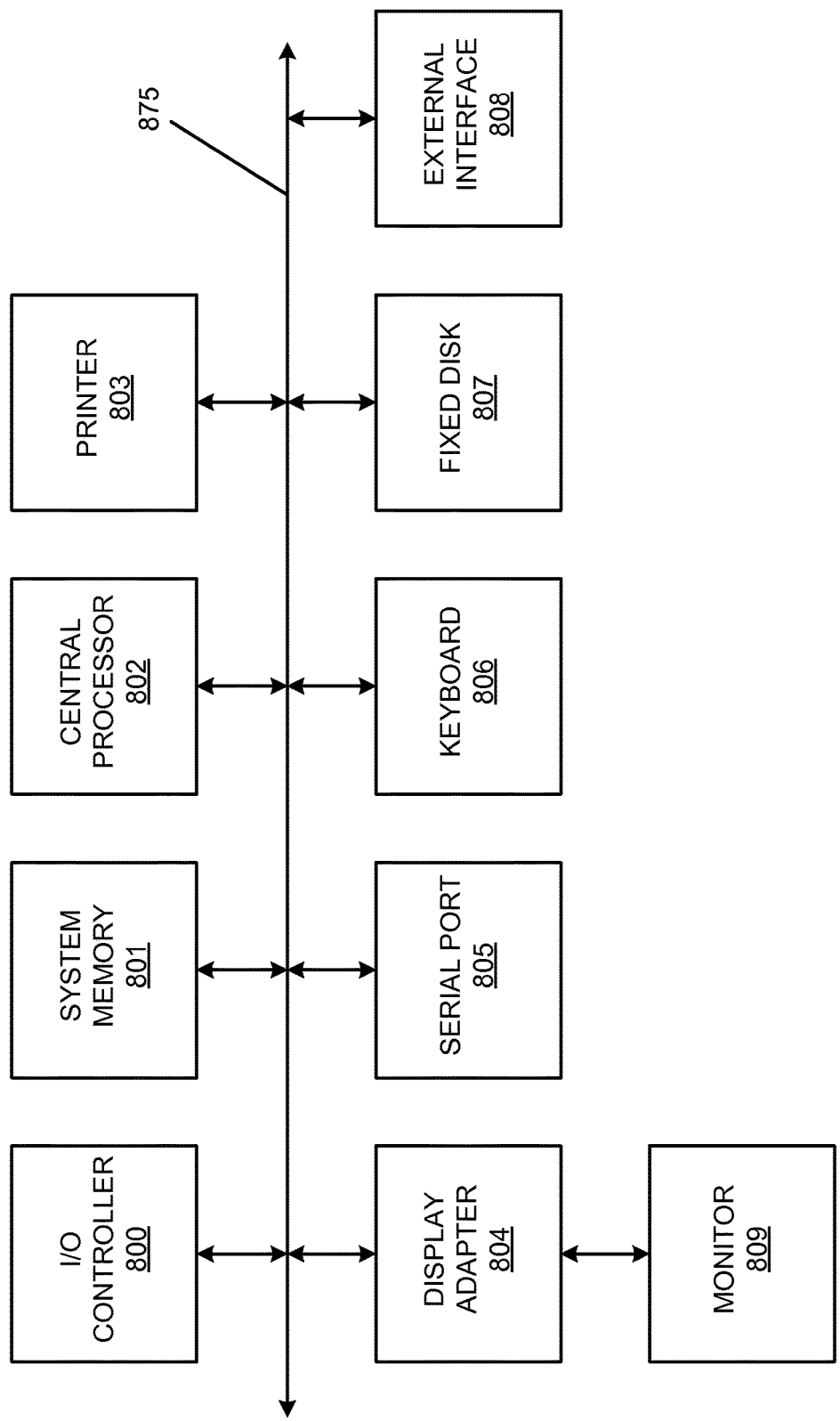
FIG. 8 shows a block diagram of an exemplary computer apparatus.

FIG. 8 is a high level block diagram of a computer system that may be used to implement any of the entities or components described above. The subsystems shown in FIG. 8 are interconnected via a system bus 875. Additional subsystems include a printer 803, keyboard 806, fixed disk 807, and monitor 809, which is coupled to display adapter 804. Peripherals and input/output (I/O) devices, which couple to I/O controller 800, can be connected to the computer system by any number of means known in the art, such as a serial port. For example, serial port 805 or external interface 808 can be used to connect the computer apparatus to a wide area network such as the Internet, a mouse input device, or a scanner. The interconnection via system bus 875 allows the central processor 802 to communicate with each subsystem and to control the execution of instructions from system memory 801 or the fixed disk 807, as well as the exchange of information between subsystems. The system memory 801 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for processing data using application code including a static applet comprising a first plurality of software functions and an updatable applet comprising a second plurality of software functions stored on a computing device, and an access control software element, the method comprising:
    determining, by a data processor, that the application code needs to be updated;
    receiving, by the data processor, updated code for a first function in the first plurality of software functions of the static applet based upon the determination;
    storing, by the data processor, the updated code for the first function in the updatable applet instead of the static applet, wherein previous code for the first function remains in the static applet;
    updating, by the data processor, a first function map of the updatable applet, the first function map comprising addresses for the software functions in the updatable applet and the static applet, wherein the updating includes updating an address of the first function to reflect a location in the updatable applet of the updated code;
    synchronizing, by the data processor, the first function map of the updatable applet with a second function map of the static applet: and
    executing, by the data processor, the updated code of the updatable applet and the static applet, through the access control software element, using the synchronized first function map and the synchronized second function map, to perform a process.

2. The method of claim 1 further comprising:
    storing the updatable applet in a trusted execution environment.

3. The method of claim 2, wherein the trusted execution environment is a secure element.

4. The method of claim 1, wherein the access control software element is a firewall.

5. The method of claim 1, wherein the process comprises conducting a payment transaction using the computing device.

6. The method of claim 1, wherein the updatable applet communicates with the static applet by accessing a plurality of shared interfaces in the static applet, wherein each shared interface comprises one or more functions in the first plurality of software functions.

7. The method of claim 1, wherein the static applet communicates with the updatable applet by accessing a plurality of shared interfaces in the updatable applet, wherein each shared interface comprises one or more functions in the second plurality of software functions.

8. The method of claim 1, wherein the static applet comprises personalization data and the updatable applet comprises no personalization data.

9. The method of claim 1, wherein the static applet verifies a source and authenticity of the updatable applet.

10. The method of claim 9, wherein the verification of the source and authenticity of the updatable applet utilizes public key cryptography.

11. The method of claim 1, wherein the static applet implements a set of one or more private functions that the updatable applet is not allowed to access.

12. A computing device comprising:
    a processor; and
    a computer readable medium coupled to the processor, the computer readable medium comprising code, executable by the processor to implement a method for processing
    data using application code including a static applet comprising a first plurality of software functions and an updatable applet comprising a second plurality of software functions stored on a computing device, and an access control software element, the method comprising;
    determining that the application code needs to be updated;
    receiving updated code for a first function in the first plurality of software functions of the static applet based upon the determination;
    storing the updated code for the first function in the updatable applet instead of the static applet, wherein previous code for the first function remains in the static applet;
    updating a first function map of the updatable applet, the first function map comprising addresses for the software functions in the updatable applet and the static applet, wherein the updating includes updating an address of the first function to reflect a location of the updated code in the updatable applet;

synchronizing the first function map of the updatable applet with a second function map of the static applet; and executing the updated code of the updatable applet and the static applet, through the access control software element, using the synchronized first function map and the synchronized second function map, to perform a process.

13. The computing device of claim 12, wherein the updatable applet is stored in a trusted execution environment.

14. The computing device of claim 13, wherein the trusted execution environment is a secure element.

15. The computing device of claim 12, wherein the access control software element is a firewall.

16. The computing device of claim 12, wherein the process comprises conducting a payment transaction using the computing device.

17. The computing device of claim 12, wherein the updatable applet communicates with the static applet by accessing a plurality of shared interfaces in the static applet, wherein each shared interface comprises one or more functions in the first plurality of software functions.

18. The computing device of claim 12, wherein the static applet communicates with the updatable applet by accessing a plurality of shared interfaces in the updatable applet, wherein each shared interface comprises one or more functions in the second plurality of software functions.

19. The computing device of claim 12, wherein the static applet comprises personalization data and the updatable applet comprises no personalization data.

20. The computing device of claim 12, wherein the static applet stores a key that is used to verify authenticity of the updatable applet.

\* \* \* \* \*